(12) United States Patent
Wang

(10) Patent No.: US 10,083,044 B2
(45) Date of Patent: Sep. 25, 2018

(54) ELECTRONIC APPARATUS WITH A BARCODE SCANNING DEVICE AND SECURE BOOTING METHOD THEREOF

(71) Applicant: Getac Technology Corporation, Hsinchu County (TW)

(72) Inventor: Chun-Chi Wang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 29 days.

(21) Appl. No.: 15/060,816

(22) Filed: Mar. 4, 2016

(65) Prior Publication Data

US 2017/0147354 A1    May 25, 2017

(30) Foreign Application Priority Data

Nov. 25, 2015  (CN) .......................... 2015 1 0829079

(51) Int. Cl.
| | |
|---|---|
| *G06F 9/4401* | (2018.01) |
| *G06K 7/14* | (2006.01) |
| *G06F 21/00* | (2013.01) |
| *G06F 21/57* | (2013.01) |
| *G06F 21/78* | (2013.01) |
| *G06F 21/62* | (2013.01) |
| *G06F 3/06* | (2006.01) |
| *G06F 21/30* | (2013.01) |
| *G06F 21/31* | (2013.01) |
| *G06F 12/14* | (2006.01) |

(52) U.S. Cl.
CPC ............ *G06F 9/4401* (2013.01); *G06F 21/00* (2013.01); *G06K 7/1413* (2013.01); *G06F 3/0622* (2013.01); *G06F 12/14* (2013.01); *G06F 21/30* (2013.01); *G06F 21/31* (2013.01); *G06F 21/575* (2013.01); *G06F 21/62* (2013.01); *G06F 21/78* (2013.01)

(58) Field of Classification Search
None
See application file for complete search history.

(56) References Cited

U.S. PATENT DOCUMENTS

| | | | | |
|---|---|---|---|---|
| 9,213,825 | B1* | 12/2015 | Gysin | ..................... G06F 21/35 |
| 9,317,851 | B2* | 4/2016 | Little, Jr. | ......... G06Q 20/40145 |
| 2003/0079132 | A1* | 4/2003 | Bryant | ...................... G06F 8/60 |
| | | | | 713/182 |
| 2003/0084352 | A1* | 5/2003 | Schwartz | ................ G06F 21/31 |
| | | | | 726/14 |
| 2003/0097585 | A1* | 5/2003 | Girard | .................. G06F 21/575 |
| | | | | 726/19 |
| 2008/0148395 | A1* | 6/2008 | Brock | ..................... G06F 21/31 |
| | | | | 726/21 |
| 2011/0078428 | A1* | 3/2011 | Hamid | .................. G06F 9/4411 |
| | | | | 713/2 |
| 2013/0031623 | A1* | 1/2013 | Sanders | ................. G06F 21/34 |
| | | | | 726/19 |

(Continued)

*Primary Examiner* — Ji H Bae
(74) *Attorney, Agent, or Firm* — Locke Lord LLP; Tim Tingkang Xia, Esq.

(57) ABSTRACT

An electronic apparatus and a booting method thereof are provided. Control a sensing unit to sense a barcode before an operation system is executed by the electronic apparatus. Determine whether the barcode meets a preset barcode. Continue a booting operation of the electronic apparatus if the barcode meets the preset barcode.

15 Claims, 3 Drawing Sheets

(56) References Cited

U.S. PATENT DOCUMENTS

| | | | |
|---|---|---|---|
| 2014/0075551 A1* | 3/2014 | Heo | G06F 21/608 726/19 |
| 2014/0208419 A1* | 7/2014 | Chang | G06F 21/31 726/21 |
| 2015/0143508 A1* | 5/2015 | Halibard | G06F 9/24 726/18 |

* cited by examiner

ELECTRONIC APPARATUS WITH A BARCODE SCANNING DEVICE AND SECURE BOOTING METHOD THEREOF

CROSS-REFERENCE TO RELATED APPLICATIONS

This non-provisional application claims priority under 35 U.S.C. § 119(a) on Patent Application No(s). 201510829079.3 filed in China on Nov. 25, 2015, the entire contents of which are hereby incorporated by reference.

BACKGROUND OF THE INVENTION

Field of the Invention

The invention is related to an electronic apparatus, and particularly to a booting method of an electronic apparatus.

Description of Related Art

As technologies advance, people get into the habit of using various electronic apparatuses for handling tasks at work, carrying out communication, browsing information or doing financial management. People not only use the electronic apparatuses to improve efficiency of work, they also save important data in the electronic apparatuses, including confidential data such as personal financial records, bank account number and password, private documents and photos, letters, business documents and intellectual properties and so on. To keep the data safely stored in the computer system, users may set user name and password to lock the hard disk for data security. Before logging in the operation system, the user is required to enter the password of hard disk to get authority for access.

SUMMARY OF THE INVENTION

The invention provides an electronic apparatus and a booting method thereof, which can make it more convenient to use the electronic apparatus.

In the invention, the electronic apparatus includes a sensing unit and an embedded controller. Before an operation system is executed by the electronic apparatus, the embedded controller controls the sensing unit to sense a barcode and determines whether the barcode meets a preset barcode. A booting operation of the electronic apparatus is continued if the barcode meets the preset barcode.

In an embodiment of the invention, the embedded controller further determines whether a mode-switching control signal is received in a booting duration of the electronic apparatus. The embedded controller controls the sensing unit to sense the barcode if the embedded controller receives the mode-switching control signal.

In an embodiment of the invention, the electronic apparatus further includes a hard disk. The embedded controller controls the sensing unit to sense the barcode before the hard disk is accessed. The hard disk is accessible if the barcode meets the preset barcode.

In an embodiment of the invention, the electronic apparatus further includes a processing unit that is coupled to the sensing unit, embedded controller and hard disk. The processing unit executes the operation system stored in the hard disk, and executes a barcode management application after the operation system completes the booting operation so as to take control of the sensing unit from the embedded controller. The processing unit controls the sensing unit to sense the barcode or conducting a setting operation to the sensing unit.

In an embodiment of the invention, the electronic apparatus further includes a preset input unit that is coupled to the embedded controller to receive an input operation. The embedded controller determines whether the input operation of the preset input unit meets a preset operation if the embedded controller does not receive the mode-switching control signal. The booting operation of the electronic apparatus is continued if the input operation meets the preset operation.

In an embodiment of the invention, the preset input unit is a keyboard, and the input operation is password input operation.

In a booting method of an electronic apparatus of the invention, the electronic apparatus includes an embedded controller. The booting method of the electronic apparatus includes the following steps, controlling a sensing unit to sense a barcode before an operation system is executed by the electronic apparatus; determining whether the barcode meets a preset barcode; continuing the booting operation of the electronic apparatus if the barcode meets the preset barcode.

In an embodiment of the invention, the booting method of the electronic apparatus further includes determining whether the embedded controller receives a mode-switching control signal in a booting duration of the electronic apparatus; controlling the sensing unit to sense the barcode if the embedded controller receives the mode-switching control signal.

In an embodiment of the invention, the booting method of the electronic apparatus includes controlling the sensing unit to sense the barcode before a hard disk of the electronic apparatus is accessed, wherein the hard disk is accessible if the barcode meets the preset barcode.

In an embodiment of the invention, the booting method of the electronic apparatus further includes the following steps, executing the operation system stored in the hard disk; obtaining control of the sensing unit from the embedded controller after the operation system completes a booting operation; and controlling the sensing unit to sense the barcode or performing a setting operation to the sensing unit.

In an embodiment of the invention, the booting method of the electronic apparatus further includes determining whether an input operation received by the electronic apparatus meets the preset operation if the embedded controller does not receive the mode-switching control signal; continuing the booting operation of the electronic apparatus if the input operation meets the preset operation.

In an embodiment of the invention, the input operation is a password input operation performed via a keyboard.

Based on the above, in the embodiments of the invention, the embedded controller controls the sensing unit to sense the barcode before the operation system is executed by the electronic apparatus, and the booting operation of the electronic apparatus is continued after it is determined that the barcode meets the preset barcode. The processing unit can execute the barcode management application after the operation system completes the booting operation so as to take control of the sensing unit from the embedded controller. Accordingly, the user's authority for access can be identified according to the sensing result from the sensing unit. Therefore, there is no need for the user to carry an additional input device, and it can be avoided that the user forgets the password and cannot get access to the electronic apparatus. The processing unit can further control the sensing unit to sense the barcode or perform the setting operation to the sensing unit after the operation system is executed to complete the booting operation, such that the sensing unit can further meet the user's actual need and make it more convenient to use the electronic apparatus.

In order to make the aforementioned features and advantages of the invention more comprehensible, embodiments accompanying figures are described in detail below.

DESCRIPTION OF EMBODIMENTS

Figure 1:
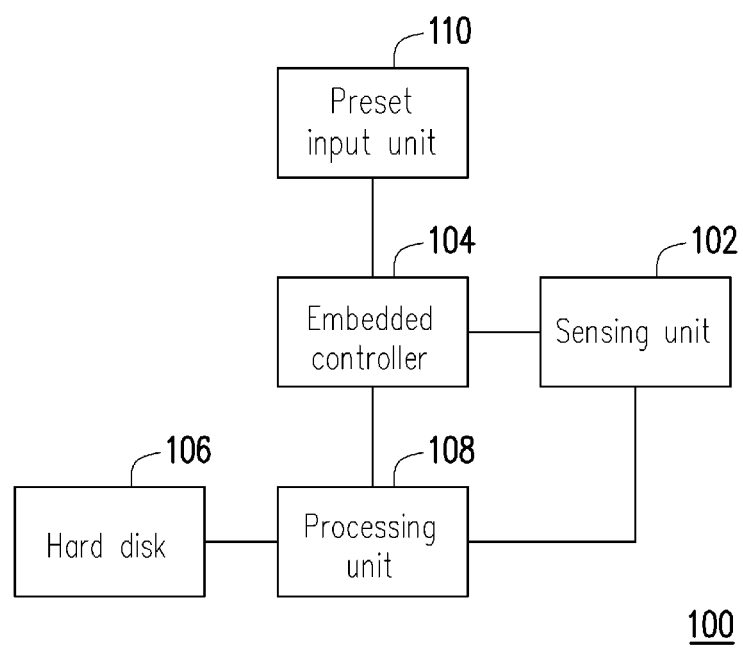
FIG. 1 is a schematic view illustrating an electronic apparatus according to an embodiment of the invention.

FIG. 1 is a schematic view illustrating an electronic apparatus according to an embodiment of the invention. Referring to FIG. 1, an electronic apparatus 100 includes a sensing unit 102, an embedded controller 104, a hard disk 106, a processing unit 108 and a preset input unit 110. The processing unit 108 is coupled to the sensing unit 102, the embedded controller 104, and the embedded controller 104 is further coupled to the preset input unit 110. The electronic apparatus 100 may be, for example, a notebook computer or a tablet PC; however, the invention is not limited thereto. In the booting process, the embedded controller 104 may obtain control of the sensing unit 102 first to control the sensing unit 102 to sense the barcode, and provide the control to the processing unit 108 after the electronic apparatus 100 completes the booting operation to execute the operation system, such that the electronic apparatus 100 can further set the characteristics of the sensing unit 102. For example, the electronic apparatus 100 can set the language system of the barcode or the frequency of the sensing unit 102 for sensing the barcode and so on. Accordingly, the sensing unit 102 can further meet the user's actual need.

Specifically, when the user presses the on-button of the electronic apparatus 100, a basic input/output system (BIOS) in the electronic apparatus 100 is turned on first, so that the BIOS can perform a complete check and test on the hardware device in the electronic apparatus 100. After the hardware device in the electronic apparatus 100 passes the check and test, the BIOS provides hardware information in the electronic apparatus 100 to the operation system so that the operation system can continue the booting process. The embedded controller 104 can control the sensing unit 102 to sense the barcode before the electronic apparatus 100 executes the operation system to determine whether the barcode meets the preset barcode. Thereafter, the hard disk 106 is accessible if the sensed barcode meets the preset barcode, such that the processing unit 108 can execute the operation system stored in the hard disk 106 to continue the booting operation of the electronic apparatus 100. After the processing unit 108 completes the booting operation to execute the operation system, the processing unit 108 can execute a barcode managing application to obtain control of the sensing unit 102 from the embedded controller 104, and control the sensing unit 102 to sense the barcode or perform a setting operation to the sensing unit 102, for example, to set the language system of the barcode or the frequency of the sensing unit 102 for sensing the barcode, such that the sensing unit 102 can further meet the user's actual need. On the other hand, the electronic apparatus 100 cannot access the hard disk 106 if the sensed barcode does not meet the preset barcode, and the booting operation cannot be continued. The operation of encrypting the hard disk 106 may be conducted by using, for example, a BitLocker disk of Microsoft operation system; however, the invention is not limited thereto.

In some embodiments, the embedded controller 104 can further determine whether a mode-switching control signal is received in a booting duration, namely after the user presses the on-button of the electronic apparatus 100 and before the processing unit 108 executes the operation system stored in the hard disk 106. The mode-switching control signal may be triggered by, for example, a physical button disposed in the electronic apparatus 100. When the user would like to use the sensing unit 102 to conduct authority check, the user may press the physical button in the electronic apparatus 100 to send the mode-switching control signal to the embedded controller 104. Accordingly, the embedded controller 104 can control the sensing unit 102 to sense the barcode if the embedded controller 104 receives the mode-switching control signal.

On the other hand, if the embedded controller 104 does not receive the mode-switching control signal, it represents that the user would like to use the preset input unit 110 to conduct authority check. The embedded controller 104 determines whether the input operation received by the preset input unit 110 meets the preset operation. The processing unit 108 can continue to perform the booting operation of the electronic apparatus 100 if the input operation meets the preset operation, such that the operation system stored in the hard disk 106 can be executed. The electronic apparatus 100 cannot continue to perform the booting operation if the input operation does not meet the preset operation. The preset input unit 110 may be, for example, a keyboard; the input operation is a password input operation that is performed via a keyboard. It should be noted that the implementation of the preset input unit 110 is not limited to the keyboard. In some embodiments, the preset input unit 110 may also be implemented by other input devices such as a fingerprint identification device or a touch panel.

As indicated above, in the embodiment, the processing unit 108 can execute the barcode managing application after the electronic apparatus 100 executes the operation system to complete the booting operation so as to obtain control of the sensing unit 102 from the embedded controller 104. In addition, the embedded controller 104 can control the sensing unit 102 to sense the barcode before the operation system is executed, such that the processing unit 108 can execute the operation system stored in the hard disk 106 after it is determined that the barcode meets the preset barcode, so that the booting operation of the electronic apparatus can be continued. The operation of encrypting the hard disk 106 may be conducted by using, for example, a BitLocker disk of Microsoft operation system; however, the invention is not limited thereto. Accordingly, the user's authority for access can be identified according to the sensing result from the sensing unit 102. Therefore, there is no need for the user to carry an additional preset input unit 110 (e.g. a keyboard), and the operation of authority check can be simplified. Meanwhile, it can be avoided that the user forgets the password and cannot get access to the electronic apparatus 100. After the processing unit 108 completes the booting operation to execute the operation system to execute the barcode managing application, the processing unit 108 can obtain control of the sensing unit 102 from the embedded controller 104 to control the sensing unit 102 to sense the barcode or perform the setting operation on the sensing unit 102, such that the sensing unit 102 can further meet the user's actual needs and it is easier for the electronic apparatus 100 to be used.

Figure 2:
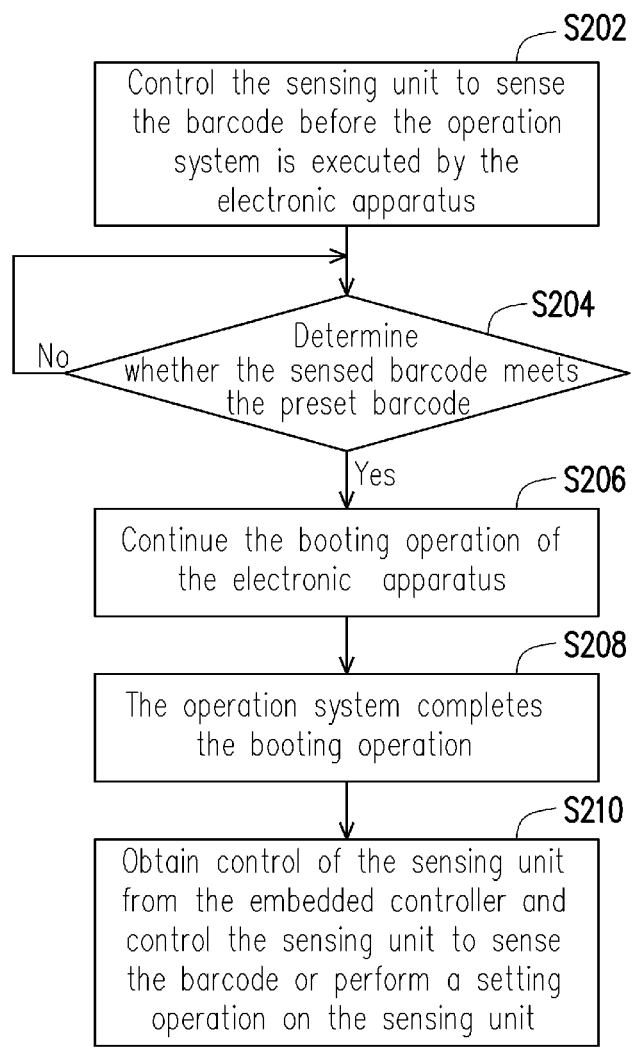
FIG. 2 is a schematic view illustrating a booting method of an electronic apparatus according to an embodiment of the invention.

FIG. 2 is a schematic view illustrating a booting method of an electronic apparatus according to an embodiment of the invention. Referring to FIG. 2, the above embodiment shows that the booting method of the electronic apparatus may include the following steps. First of all, a sensing unit is controlled to sense a barcode before an operation system is executed by the electronic apparatus (step S202). Subsequently, it is determined whether the sensed barcode meets a preset barcode (step S204). A hard disk of the electronic apparatus is unlocked and accessible if the barcode meets the preset barcode. Thereafter, the booting operation of the electronic apparatus is continued and the operation system in the hard disk of the electronic apparatus is executed (step S206), wherein an operation of encrypting the hard disk 106 may be conducted by using a BitLocker disk of Microsoft system, but the invention is not limited thereto. In addition, the processing unit 108 can obtain control of the sensing unit from an embedded controller after the operation system completes the operation system, such that a barcode managing application controls the sensing unit to sense the barcode or performs a setting operation on the sensing unit (step S210). For example, it can be determined whether the user presses a scan control button of the sensing unit. If the user presses the scan control button of the sensing unit, a scan control instruction is sent to the sensing unit to control the same to scan the barcode. The setting operation may be conducted, for example, to set the language system of the barcode or the frequency of the sensing unit for sensing the barcode and the like. On the other hand, if the barcode does not meet the preset barcode in step S204, step S204 is further continued to determine whether the sensed barcode meets the preset barcode.

Figure 3:
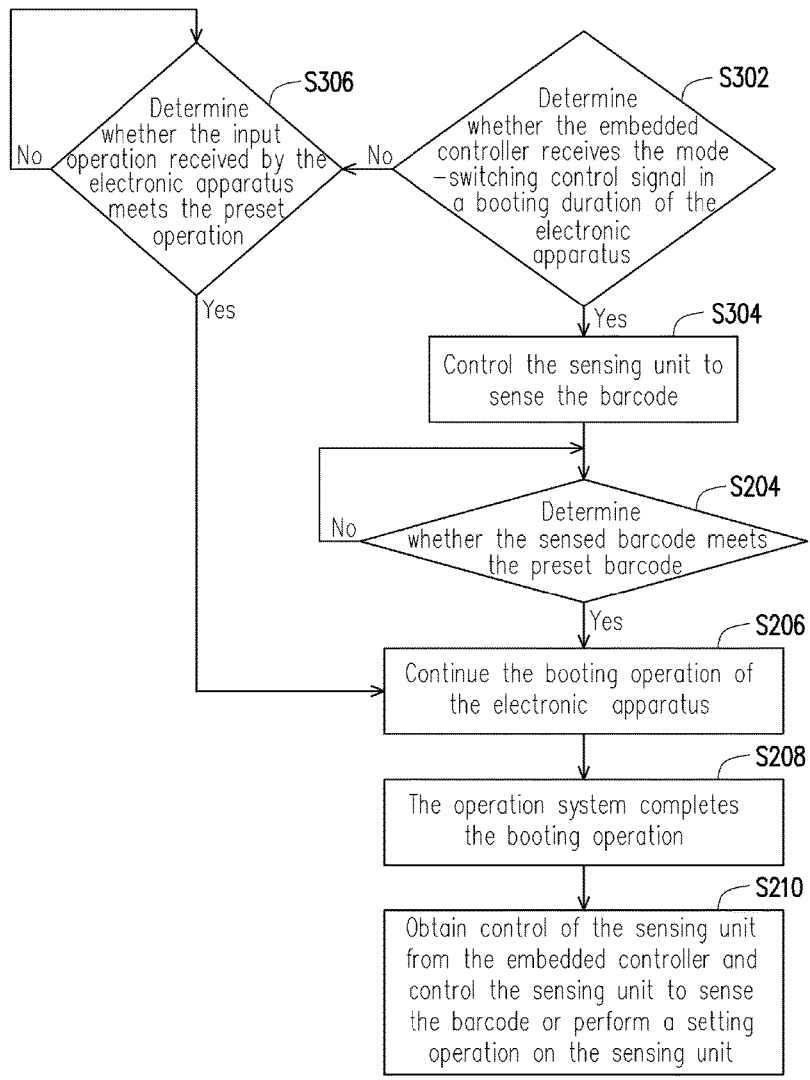
FIG. 3 is a schematic view illustrating a booting method of an electronic apparatus according to another embodiment of the invention.

FIG. 3 is a schematic view illustrating a booting method of an electronic apparatus according to another embodiment of the invention. Referring to FIG. 3, in some embodiments, before the operation system is executed by the electronic apparatus, the embedded controller can determine whether a mode-switching control signal is received in a booting duration (i.e. step S302), namely, after the user presses an on-button of the electronic apparatus and before the operation system stored in the electronic apparatus is executed. The sensing unit is controlled to sense the barcode if the embedded controller receives the mode-switching control signal (i.e. step S304). Thereafter, step S204 is performed to determine whether the sensed barcode meets the preset barcode, wherein the mode-switching control signal may be triggered by, for example, a physical button disposed in the electronic apparatus. After step S204 is performed, steps S206, S208 and S210 are performed sequentially, and the descriptions are the same as the corresponding descriptions in the embodiment of FIG. 2; therefore, no repetition is incorporated herein. On the other hand, if the embedded controller does not receive the mode-switching control signal in step S302, step S306 is performed to determine whether the input operation received by the electronic apparatus meets the preset operation. If the input operation received by the electronic apparatus meets the preset operation, step S206 is performed to continue the booting operation of the electronic apparatus. If the input operation does not meet the preset operation, step S306 is continued to determine whether the input operation received by the electronic apparatus meets the preset operation, wherein the input operation may be, for example, a password input operation conducted by a keyboard; however, the invention is not limited thereto.

Based on the above, in the embodiments of the invention, the embedded controller can control the sensing unit to sense the barcode before the operation system is executed by the electronic apparatus, and continue to perform the booting operation of the electronic apparatus after it is determined that the barcode meets the preset barcode. Accordingly, the processing unit can execute the barcode managing application after the booting operation is completed to execute the operation system, so as to obtain control of the sensing unit from the embedded controller. Based on the above, the user's authority for access can be identified according to the sensing result from the sensing unit. Therefore, there is no need for the user to carry an additional preset input unit (e.g. the keyboard), and operation of authority check can be simplified. Also, it can be avoided that the user forgets the password and cannot get access to the electronic apparatus. Moreover, the processing unit can further control the sensing unit to sense the barcode or perform the setting operation to the sensing unit after the booting operation is completed to execute the operation system, such that, the sensing unit can further meet the user's actual needs and it is easier for the electronic apparatus to be used.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:
1. An electronic apparatus, comprising:
a barcode scanning device for scanning a barcode;
an embedded controller embedded into the electronic apparatus configured to control the barcode scanning device before an operation system is executed by the electronic apparatus and determine whether the barcode meets a preset barcode, continue a booting operation of the electronic apparatus if the barcode meets the preset barcode; and
a processing unit, directly connected to the barcode scanning device, the embedded controller and a hard disk, wherein the processing unit
executes the operation system stored in the hard disk, and
obtains control of the barcode scanning device from the embedded controller after the booting operation is complete to execute the operation system, such that the processing unit executes a barcode managing application to control the barcode scanning device to scan the barcode or to perform a setting operation on the barcode scanning device,
wherein the embedded controller is directly connected to the barcode scanning device, a preset input device and the processing unit, and the barcode scanning device is directly connected to the embedded controller and the processing unit, and
wherein the barcode scanning device is controlled by the embedded controller before the booting operation is complete and controlled by the processing unit after the booting operation is complete, respectively.
2. The electronic apparatus according to claim 1, wherein the embedded controller further determines whether a mode-switching control signal is received in a booting duration of the electronic apparatus, and the barcode scanning device is controlled to scan the barcode if the embedded controller receives the mode-switching control signal.

3. The electronic apparatus according to claim 1, wherein the embedded controller controls the barcode scanning device to scan the barcode before the hard disk is accessed, and the hard disk is accessible if the barcode meets the preset barcode.

4. The electronic apparatus according to claim 1, wherein the preset input device is coupled to the embedded controller, receiving an input operation, the embedded controller determining whether the input operation of the preset input device meets a preset operation if the embedded controller does not receive a mode-switching control signal, continuing the booting operation of the electronic apparatus if the input operation meets the preset operation.

5. The electronic apparatus according to claim 4, wherein the preset input device is a key board, and the input operation is a password input operation.

6. The electronic apparatus according to claim 1, wherein the setting operation is conducted to set a language system of the barcode.

7. The electronic apparatus according to claim 1, wherein the setting operation is conducted to set a frequency of the barcode scanning device for scanning the barcode.

8. A booting method of an electronic apparatus, the electronic apparatus comprises an embedded controller, the booting method of the electronic apparatus comprising:
controlling a barcode scanning device for scanning a barcode before an operation system stored in a hard disk is executed by the electronic apparatus;
determining whether the barcode meets a preset barcode;
continuing the booting operation of the electronic apparatus if the barcode meets the preset barcode;
executing the operation system by a processing unit that is coupled to the barcode scanning device, the embedded controller and the hard disk, and
obtaining control of the barcode scanning device by the processing unit from the embedded controller after the booting operation is complete to execute the operation system, such that the processing unit executes a barcode managing application to control the barcode scanning device to scan the barcode or to perform a setting operation on the barcode scanning device, wherein
the embedded controller is directly connected to the barcode scanning device, a preset input device and the processing unit; the barcode scanning device is directly connected to the embedded controller and the processing unit; and the processing unit is directly connected to the embedded controller, the barcode scanning device and the hard disk; and
the barcode scanning device is controlled by the embedded controller before the booting operation is complete and controlled by the processing unit after the booting operation is complete, respectively.

9. The booting method of the electronic apparatus according to claim 8, further comprising:
determining whether the embedded controller receives a mode-switching control signal in a booting duration of the electronic apparatus, and controlling the barcode scanning device to scan the barcode if the embedded controller receives the mode-switching control signal.

10. The booting method of the electronic apparatus according to claim 8, comprising:
controlling the barcode scanning device to scan the barcode before the hard disk in the electronic apparatus is accessed, wherein the hard disk is accessible if the barcode meets the preset barcode.

11. The booting method of the electronic apparatus according to claim 10, further comprising:
executing the operation system stored in the hard disk; and
obtaining control of the barcode scanning device from the embedded controller after the operation system completes the booting operation, and controlling the barcode scanning device to scan the barcode or performing a setting operation to the barcode scanning device.

12. The booting method of the electronic apparatus according to claim 10, further comprising:
determining whether an input operation received by the electronic apparatus meets a preset operation if the embedded controller does not receive a mode-switching control signal, and continuing the booting operation of the electronic apparatus if the input operation meets the preset operation.

13. The booting method of the electronic apparatus according to claim 12, wherein the input operation is a password input operation conducted via a keyboard.

14. The booting method of the electronic apparatus according to claim 8, wherein the setting operation is conducted to set a language system of the barcode.

15. The booting method of the electronic apparatus according to claim 8, wherein the setting operation is conducted to set a frequency of the barcode scanning device for scanning the barcode.

* * * * *